Patented Apr. 28, 1931

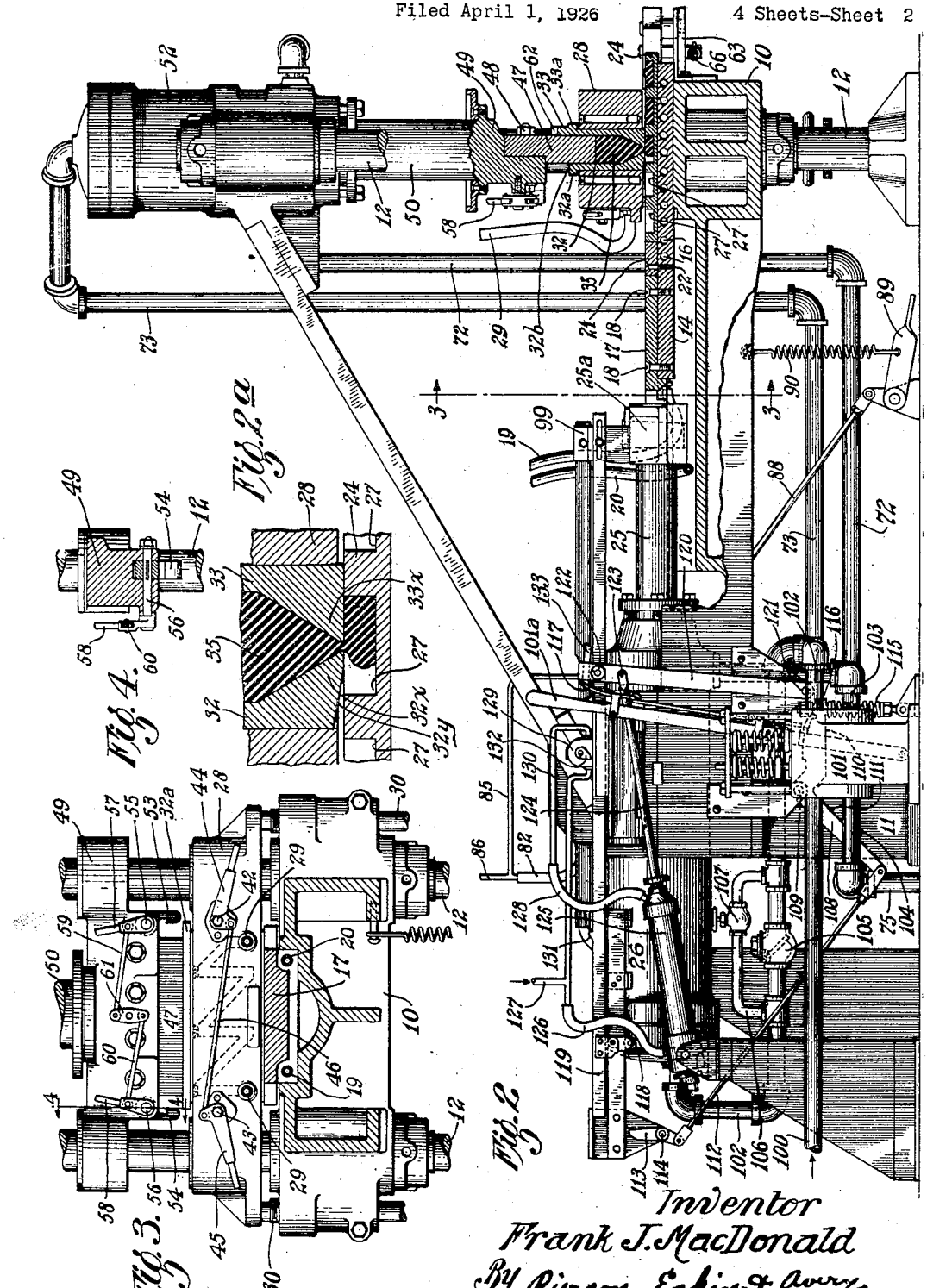

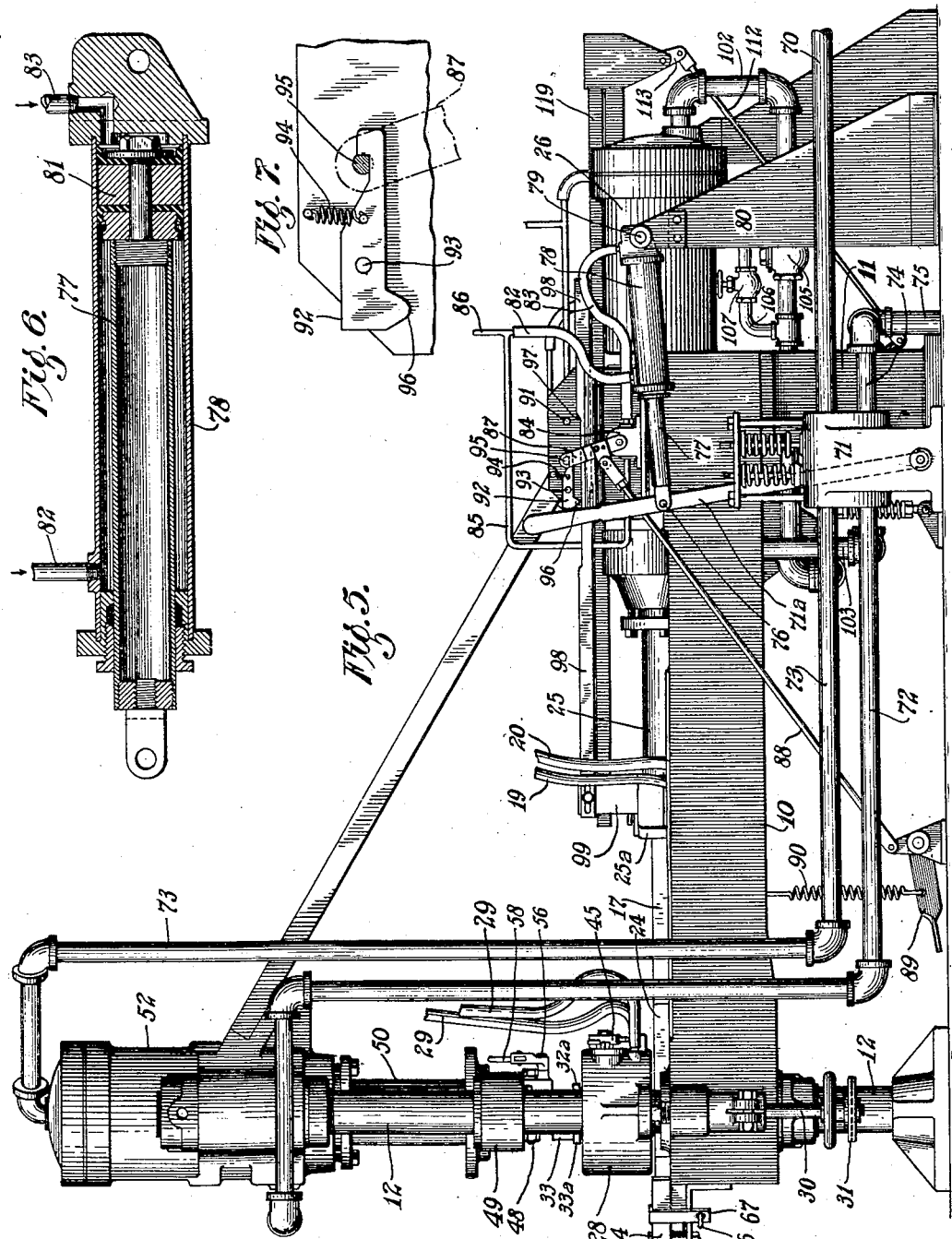

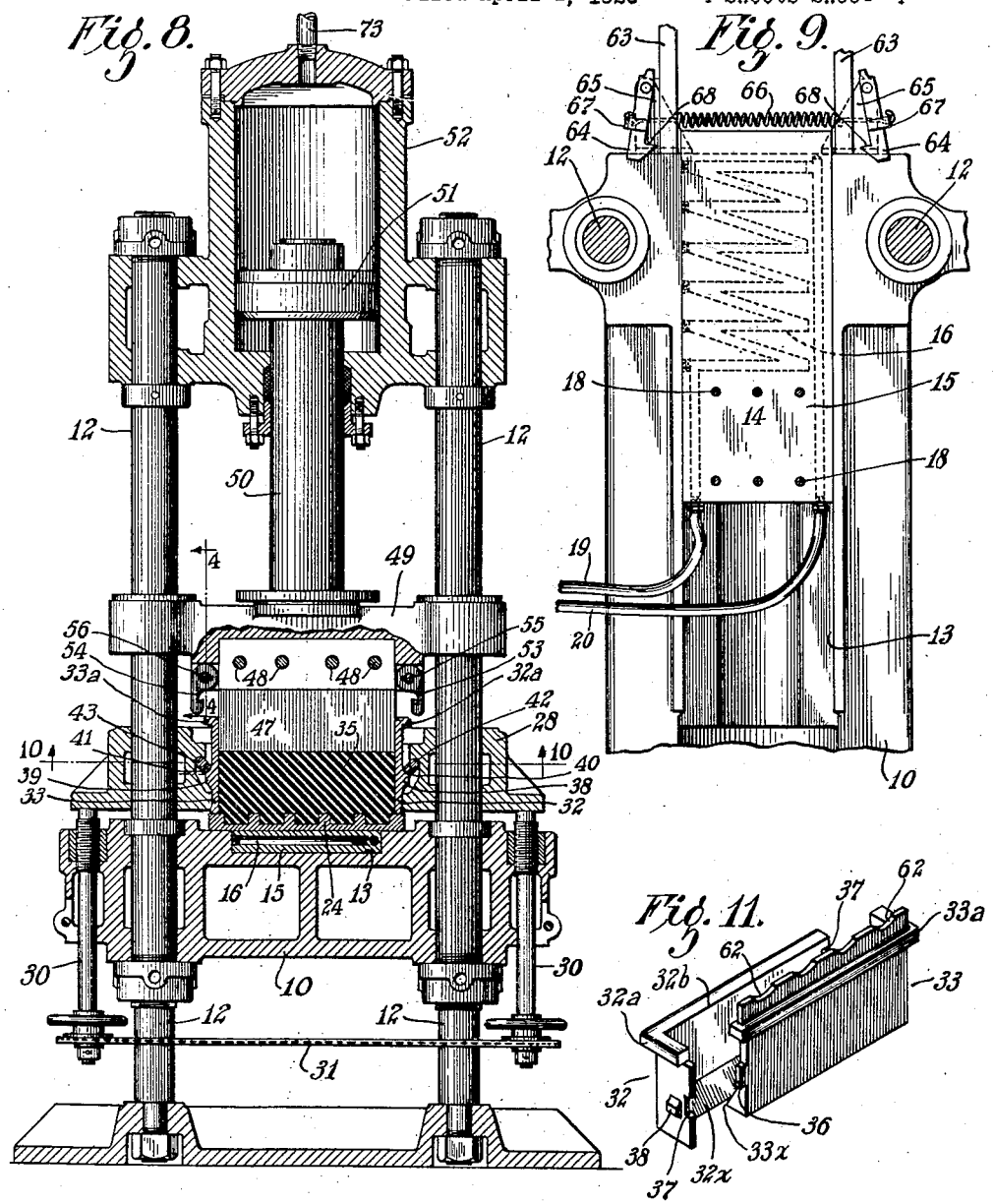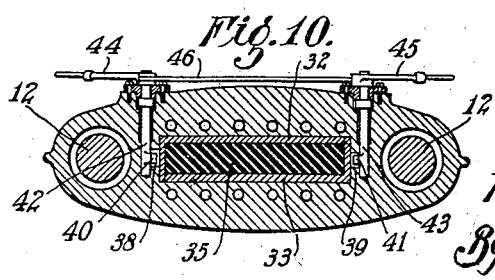

1,802,978

UNITED STATES PATENT OFFICE

FRANK J. MacDONALD, OF ELLET, OHIO, ASSIGNOR TO THE B. F. GOODRICH COMPANY, OF NEW YORK, N. Y., A CORPORATION OF NEW YORK

APPARATUS FOR MOLDING PLASTIC MATERIAL

Application filed April 1, 1926. Serial No. 99,070.

This invention relates to the art of molding plastic material and more particularly to the filling of mold cavities with such material, being of especial advantage in filling successive mold cavities in a unitary operation.

Some of the features of procedure and apparatus involved in my present invention are described and claimed in Letters Patent No. 1,568,562, granted January 5, 1926; No. 1,658,564, granted February 7, 1928; No. 1,658,565, granted February 7, 1928; No. 1,658,566, granted February 7, 1928; and No. 1,658,567, granted February 7, 1928, all of said Letters Patent relating to methods and apparatus wherein a mass of plastic stock such as a rubber compound is pressed against a surface while being relatively moved along the same so as to give off stock as a layer upon the said surface.

The chief objects of my present invention are to provide improved and economical procedure and apparatus for filling mold cavities, and especially for filling a plurality of cavities in a unitary operation. An especial object of the present invention is to provide procedure and apparatus for economically filling the cavities of a mold plate such as is commonly used for the molding of rubber heels or the like. Further and more specific objects pertaining to simplicity of structure and facility of operation will be manifest.

Of the accompanying drawings:

Fig. 2 is a front side elevation of the same with parts broken away and in section.

Figure 1:
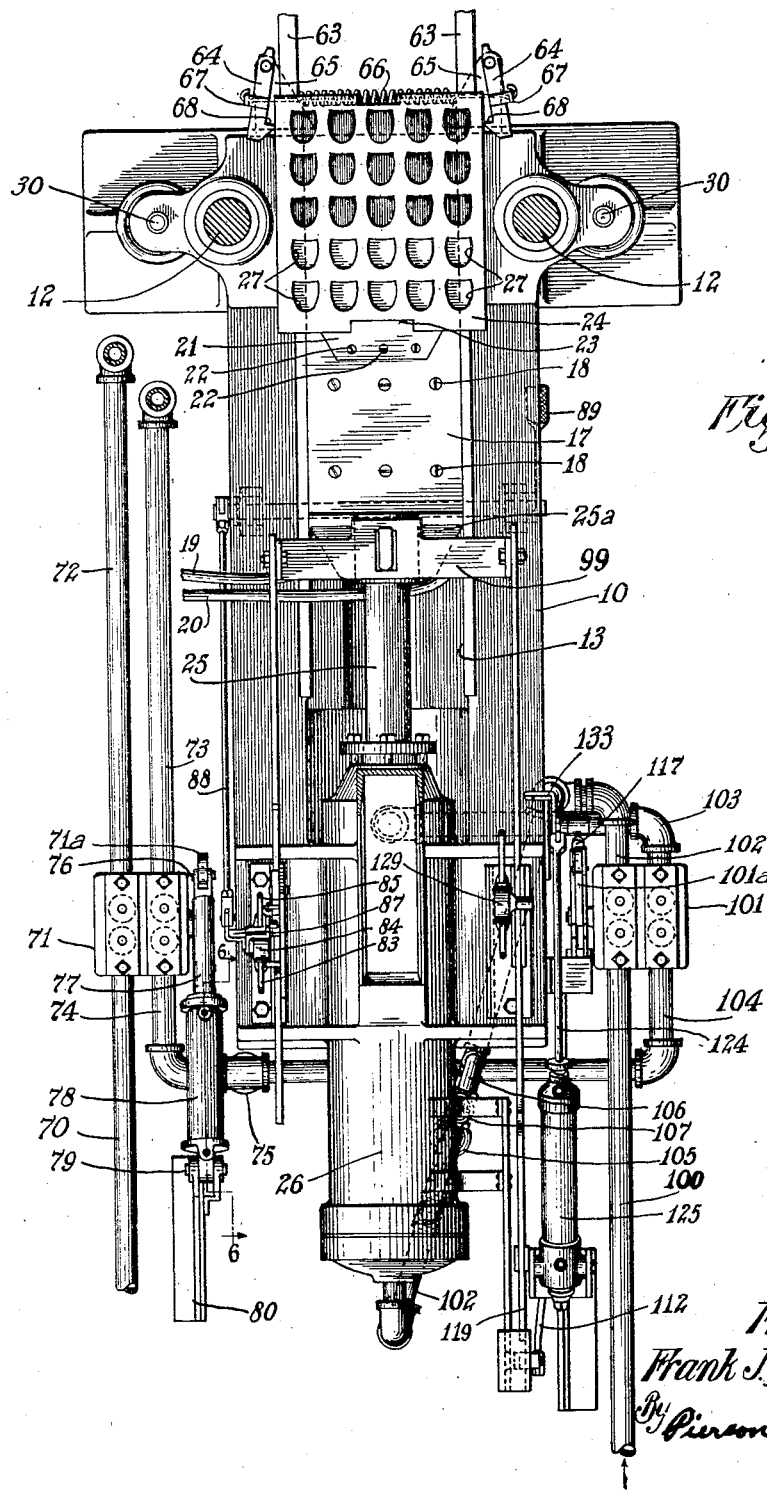
Fig. 1 is a plan view of apparatus embodying and adapted to carry out my invention in its preferred form.

Fig. 2ª is a vertical section of the die assembly and mold as shown in Fig. 2 but on a larger scale.

Fig. 3 is a section on line 3—3 of Fig. 2.

Fig. 4 is a section on line 4—4 of Fig. 3 or Fig. 8.

Fig. 5 is a rear side elevation of the apparatus.

Fig. 6 is a longitudinal vertical section of a valve actuating cylinder, on line 6—6 of Fig. 1.

Fig. 7 is a fragmentary elevation on a larger scale of parts of a valve tripping mechanism shown in Fig. 5.

Fig. 8 is a vertical section of the mold filling mechanism.

Fig. 9 is a plan view of parts of the apparatus including a mold-carrying slide.

Fig. 10 is a horizontal section on line 10—10 of Fig. 8, as viewed from below.

Fig. 11 is a perspective view of a two-part stock extruding die.

Referring to the drawings, the apparatus comprises a table 10 supported at one end upon a standard or leg 11 and at the other end upon a pair of guide posts 12, 12 which extend above the table to serve as guiding and supporting means for stock pressing instrumentalities hereinafter described.

Mounted in a longitudinal guide-way 13 formed in the upper face of the table 10 is a mold-carrying slide 14 comprising a plate 15 formed with a zigzag steam passage 16 for the circulation of steam therethrough and a mold-engaging plate 17 overlying one end portion of the steam plate 15 and secured thereto by screws 18, 18. The steam plate 15 is provided with suitable flexible pipes 19 and 20 for circulating steam therethrough from any suitable source of steam supply (not shown).

The mold-engaging plate 17 is notched at its forward end to accommodate a complementally shaped plate 21 fitted into the notch, the said plate 21 being secured to the underlying steam plate by screws 22, 22 and formed at its forward end with a lug 23 adapted to fit into a notch formed in the edge of a vulcanizing mold such as the rubberheel mold 24, the plate 21 being removable for substitution of other plates adapted to interfit with different types of molds.

The mold-carrying slide 14 comprising the plates 15 and 17 is secured to the end of a piston rod 25 projecting from a fluid pressure cylinder 26 which is mounted upon the table 10 and adapted to reciprocate the mold-carrying slide 14 in its guide-way.

For filling the mold cavities 27, 27 (Fig. 1) of the heel-mold 24 in succession as the mold moves along the table a rubber-extruding mechanism is mounted over the table in such position that the heel-mold will pass thereunder with the upper face or lands of the mold in sliding contact with the mouth of the extruding device.

The said device comprises a steam-heated die box or frame 28 provided with steam-circulating pipes 29, 29 (Figs. 2, 3 and 5), the said die-box being slidably mounted upon the guide posts 12 and adapted to be raised or lowered thereon for adjustment by a pair of vertical supporting screws 30, 30 (Figs. 1, 5 and 8) which are mounted in the sides of the table 10 and operatively connected under the table, for simultaneous adjustment, by a sprocket chain 31 mounted upon sprockets secured to the respective screws 30, 30, (see Fig. 8), the die-box 28 thus being adapted to being raised or lowered according to the thickness of the mold 24 which is to be filled.

The die-box 28 is provided with a removable lining structure consisting of a pair of plates 32 and 33, the said plates being formed with respective inwardly projecting toe portions $32^x$, $33^x$ along their bottom edges, which extend nearly but not quite to each other when the plates are in position in the die-box, so as to define a die aperture or apertures for the extrusion of a plastic mass such as a rubber compound 35 into the mold cavities by an extruding plunger 47 hereinafter described. The die-box assembly presents lower faces adapted slidably to fit against the lands of a mold passed thereunder upon the slide 14, the said faces being of such extent in the direction of movement of the mold as substantially to close off each mold cavity as the filling of the latter is completed, as shown clearly in Fig. $2^a$, so that stock cannot escape from the cavity under the pressure of the plunger 47.

The plates 32 and 33 are formed with respective flanges $32^a$ and $33^a$ to bear upon the upper face of the die-box to support them at a proper elevation therein, and the lower face of the plate 32 is beveled, as shown at $32^y$, Fig. $2^a$, so that the plate assembly will be slightly lifted by the mold passing thereunder, and the force of the plunger upon the stock, the latter bearing upon the toe portions of the plates, will then hold the plates downward in close contact with the upper face of the mold to prevent escape of stock and provide an effective shearing action of the toe portion $33^x$ of the plate 33 coacting with the mouth edges of the successive mold cavities.

Each of the plates is of an L-form in plan view, each representing one side and an end of a rectangular figure, and the plate 33 is provided with a lug such as the lug 36 (Fig. 11) projecting from each of its end edges and adapted to fit into respective notches 37, 37 in the end edges of the plate 32, to prevent relative vertical movement of the plates when they are in position in the die-box 28.

For holding the plates 32 and 33 downward in the die-box against the force of the plunger when the latter rises, each of the plates is formed with a lug 38 or 39 (Figs. 8 and 11) on its outside face at the end of the die structure, and respective hold-down cam lugs 40 and 41 are adapted to be brought to bear upon the lugs 38 and 39, the lugs 40 and 41 being formed upon respective rock-shafts 42 and 43 which are mounted in the die-box 28 and are connected outside of the latter (Fig. 3) by hand levers 44 and 45 and a link 46, for simultaneous operation.

The plunger 47 for forcing the rubber compound 35 down through the die aperture is adapted slidably to fit within the plates 32, 33 and is secured by bolts 48, 48 to a cross-head 49 which is slidably mounted upon the guide posts 12 and secured to the lower end of a vertical piston-rod 50 having its piston 51 in a fluid-pressure cylinder 52 which is secured upon the upper ends of the guide posts 12.

For pulling the pair of die plates 32, 33 from the die-box 28 at will upon the lifting of the plunger 47 and cross-head 49, a pair of hooks 53, 54 are secured upon respective shafts 55, 56 rotatably mounted on the cross-head 49, the said shafts being operatively connected outside the cross-head by hand levers 57, 58, links 59, 60, and a lever 61, for simultaneous operation of the hooks, the latter being adapted to be engaged under the respective flanges $32^a$, $33^a$ of the die-plates, so as to pull the latter from the die-box upon the ascent of the cross-head 49, the hold-down lugs 40, 41 being at such time turned clear of the respective lugs 38, 39 (Fig. 8) of the die-plates. The die-plates 32 (see Fig. 2) is formed with a straight upper edge $32^b$ adapted to coact with the plunger 47 to shear off a slab of stock advanced over the said edge, for charging the die with stock, and the opposite die-plate 33 preferably extends somewhat higher than the plate 32 in order to serve as a stop for the slab of stock so advanced over the edge $32^b$ of the plate 32, the plate 33 being here shown as being of considerable height and formed with notches 62, 62 (Figs. 2 and 11) to admit the bolts 48 and the nuts thereon by which the plunger 47 is secured to the cross-head 49.

The upper surfaces of the mold-propelling plates 17 and 21 are of plane form and are flush with the upper face of the mold 24 so that they may pass under the die structure and close off the die aperture in the same manner that the lands of the mold do, while the mold is propelled from under the die structure.

A pair of rails 63, 63 are secured to the table 10 in position to receive and support the mold as the latter passes from under the die. For holding the mold in position over the said rails, upon the retraction of the mold-carrying slide 14, so that the mold will fall onto the rails as soon as the slide has been drawn from under it, a pair of cam latches 64, 64 are pivoted upon respective brackets 65, 65 and connected by a pull spring 66 which is anchored at its ends to respective arms 67, 67 which project downward from the cam latches and are adapted to contact the respective brackets to limit the inward movement of the latches, the latter being so formed so as to be spread apart by the mold 24 as the latter passes between them and then to interlock with the rear edge face of the mold when the latter has passed beyond their detent lugs 68, 68, so as to prevent the mold from returning toward the die structure when the slide 14, sliding from under the mold, is returned to its starting position.

For actuating the vertical plunger-reciprocating cylinder 52, a hydraulic supply-pipe 70, leading from a suitable source of hydraulic pressure, runs to a reversing-valve 71 (Figs. 1 and 5), which may be of known construction, the valve 71 being adapted, when its control lever 71ª is thrown to the right as viewed in Fig. 5, to connect the supply-pipe 70 with a pipe 72 running to the lower end of the vertical cylinder while connecting a pipe 73, running from the upper end of the cylinder, with an exhaust pipe 74 connected with a discharge pipe 75 extending downward through the floor, so that the plunger 47 rises when the lever 71ª is in its right-hand position as viewed in Fig. 5, and descends when the lever 71ª is in its left-hand position as there viewed.

For normally holding the lever 71ª in its right-hand position as viewed in Fig. 5 the said lever is pivoted at 76 to the piston-rod 77 of cylinder 78 which is hinged at 79 to a standard 80, the piston-rod being of large diameter, as shown in Fig. 6, so that its piston 81 is a differential piston, being normally held in its right-hand position by constant air pressure applied to its annular face about the piston-rod 77 through a pipe 82 which is constantly in communication with a source of compressed air, the piston being adapted to be forced in the opposite direction against the said constant air pressure by an equal air pressure applied to the larger area of its opposite face through a pipe 83 having communication through a control valve 84 and a pipe 85 with the same air-supply pipe 86 which is constantly in communication with the small-area side of the piston 81.

For operating the valve 84 to throw the lever 71ª to left as viewed in Fig. 5, and thus, through the valve 71, to drive downward the plunger 47, the control lever 87 of the said valve is connected by a link 88 with a foot treadle 89, and for actuating the valve lever 87 in the opposite direction to cut off the supply of compressed air to the large area end of the cylinder 78 and vent it to the atmosphere, the treadle 89 is connected to the table 10 by a pull spring 90, the said spring being adapted to hold the valve lever 87 against a stop 91.

A cam latch 92 is pivoted on a fixed part of the machine at 93 and urged in a counter-clockwise direction as viewed in Fig. 5 by a pull spring 94, its adjacent end being formed to receive and hold a stud 95 projecting laterally from the valve lever 87 when the treadle 89 is sufficiently depressed, the latch 92 being thus adapted to cause the extruding plunger 47 to be continuously urged downward while the mold 24 passes under the die structure to receive its charge of stock.

For automatically reversing the cylinder 52 to lift the extruding plunger 47 when the mold 24 has received its charge of stock and has moved to a determined position, the latch 92 is formed with a cam-lug 96 adapted to be engaged by a cam-shoulder 97 formed upon a bar 98 which is secured to one arm of a U-shaped yoke 99 mounted upon the cross-head 25ª of the horizontal piston-rod 25, to trip the latch 92 and thus permit the pull spring 90, through the valve-lever 87, to reverse the cylinder 78 and consequently the cylinder 52 of the plunger.

The actuating mechanism for the horizontal, mold-propelling cylinder 26 will be best understood with reference to Figs. 1 and 2. A hydraulic supply pipe 100 leads to a reversing valve 101, which may be of any known or suitable construction, adapted, when its control lever 101ª is in its extreme right-hand position as viewed in Fig. 2, to charge the rear end of cylinder 26 through a pipe 102 while venting the forward end of the said cylinder through pipes 103 and 104 and, when its control lever 101ª is in its extreme left-hand position, as viewed in Fig. 2, to charge the front end of the cylinder 26 through the pipe 103 while venting the rear end of said cylinder through the pipe 102 and a pipe 104 which leads to the vertical discharge pipe 75, and the said valve 101 is adapted, when its control lever 101ª is in an intermediate position to close off both pipes leading from the cylinder 26 and thus to hold the mold-propelling piston rod 25 stationary.

A check-valve 105 is interposed in the pipe 102 to permit a rapid return of the mold-propelling piston rod 25 although compelling water passing to the rear end of the cylinder 26 to flow through a by-pass 106 provided with a throttle valve 107, so that the forward movement of the mold-propelling piston-rod 25 may be regulated as to speed by adjustment of the said throttle valve 107.

The construction of the reversing valve 101 is such that its control lever naturally assumes an intermediate position, with all pipes closed, and for holding it in its extreme right-hand or left-hand position a bell-crank lever 108 is fulcrumed at 109 on a stationary part of the machine and has one arm 110 formed as a ratchet and its other arm 111 connected by a link 112 with a contact lever 113 fulcrumed at 114 on a stationary part of the machine, a compression spring 115 being interposed between the ratchet arm 110 and the floor to hold the said ratchet against a stop-face formed on the control lever 101ª. The said control lever is provided with a spring-backed sliding pawl 116 connected with a pawl-lifter 117 and adapted to be engaged with the ratchet arm 110 to hold the lever 101ª in either its right-hand or left-hand position, the pawl 116 being limited in its downward movement so that it may be disengaged on the descent of the ratchet arm 110 as well as by the lifting of the pawl.

For lowering the ratchet 110 when the mold 24 has reached a position in its forward movement such that its forward margin closes off the die-aperture, the control lever 101ª at such time being in its forward or right-hand position (Fig. 2), and thus to permit the lever 101ª to move to neutral position and stop the mold, a contact roller 118 is mounted upon a bar 119 which is secured to the yoke 99, the said cam roller being adapted in its forward movement to engage the lever 113.

For drawing the control lever 101ª to its left-hand position at the end of the forward movement of the mold, a lever 120, fulcrumed at 121, is provided at its upper end with a laterally projecting roller 122 adapted to engage the pawl-lifter 117 and force the lever 101ª to left, the lever 120 being pivoted at 123 to the piston rod 124 of a cylinder 125, the construction of the said cylinder and its piston being the same as that shown in Fig. 6 and above described, the small-area side of its piston being connected, through a pipe 126, with a constant-pressure air pipe 127, and the large-area side of its piston being connected through a pipe 128, a three-way valve 129, and a pipe 130, with the constant-pressure pipe 127, the said valve 129 being adapted alternately to charge and exhaust the large area end of the cylinder 125 through the pipe 128.

For charging the said large area end of the cylinder 125, to throw the lever 120 and 101ª to the left at the end of the forward movement of the mold 24, a cam lug 131 is formed on the bar 119 and adapted to engage the actuating lever 132 of the valve 129.

For returning the lever 120 to its right-hand position after it has set the lever 101ª in its left-hand or reverse position, a bracket 133 is secured to the lever 120 and adapted to engage the actuating lever 132 of the valve 129 and reverse the latter near the end of the leftward movement of the lever 120.

In the operation of the machine, the lever 71ª being held in its right hand position as viewed in Fig. 5, by the cylinder 78, to hold the extruding ram 47 elevated, and the lever 101ª being set in its extreme left-hand position as viewed in Fig. 2, to hold the mold-carrying slide 14 retracted, the operator grasps the lever 101ª (Fig. 2), lifts the pawl 116, and sets the lever in its extreme right-hand position, whereupon the rear end of the mold-advancing cylinder 26 is charged and its front end vented, as above described, to advance the mold-carrying slide with a mold 24 thereon until the forward margin of the upper face of the mold closes the die-aperture defined by the plates 32, 33, at which time the cam roller 118 engages the lever 113 and thus depresses the ratchet arm 110, permitting the lever 101ª to return to middle position and close off both ends of the cylinder 26 so as to hold the mold in this die-closing position.

The operator then repeatedly advances a slab of stock over the upper edge of the die-plate 32 and causes the plunger 47 to descend repeatedly, to shear off blocks of stock from the slab and pack them into the chamber defined by the die-plates 32, 33, reciprocation of the shearing and extruding plunger 47 being effected by depressing and releasing the treadle 89 but not through so wide a range of movement as to cause the lever 87 (Fig. 5) to be retained by the latch 92, the operator, at the end of this die-charging operation, further depressing the treadle 89 so as to cause the latch 92 to engage and retain the valve lever 87 and thus, through the cylinder 78 and valve 71 cause the ram 47 to bear continuously upon the stock within the die-chamber.

The operator then again moves the lever 101ª (Fig. 2) and sets it in its right-hand position, as shown in Fig. 2, thus causing the cylinder 26 to move onward the mold 24, the plunger or ram 47 causing the stock to flow through the die-aperture and fill the several cavities of the mold successively as they pass under the die, the stock in each cavity being sheared off from the supply mass of stock by the co-action of the lands of the mold with the toe portion 33ˣ of the die-plate 33, so that the mold cavities are filled with stock and the latter is sheared off flush with the mouth of the cavity.

When all of the mold cavities have thus been filled, the near shoulders of the mold pass the detents 68 of the cam latches 64 and interlock therewith against return movement of the mold, and the cam shoulder 97 (Fig. 5) disengages the latch 92 from the stud 95 of the lever 87 to lift the extruding plunger 47. Shortly thereafter the lug 131 (Fig. 2) engages the valve lever 132 of the valve 129, causing the latter to charge the large-area end of the cylinder 125, which drives the lever 120 to the left as viewed in Fig. 2, the cam roller 122 engaging the pawl lifter 117 and forcing the lever 101ᵃ to its extreme left-hand position, where it is held by the pawl 116 engaging the ratchet arm 110, thus reversing the cylinder 26 and withdrawing the mold-carrying slide 14 from under the mold 24, permitting the latter to rest upon the mold-supporting rails 63 for removal therefrom by hand. Near the end of the leftward movement of the lever 120, after the lever 101ᵃ has been forced to a position such that it will be retained by the pawl 116, the bracket 133 mounted upon the lever 120 engages the valve lever 132 and thus exhausts the large-area end of the cylinder 125, so that the lever 120 is immediately returned to its right-hand position while the lever 101ᵃ is retained in its far left-hand position for the return movement of the mold-carrying slide 14.

The operation as described is then repeated with successive molds, the die-chamber being refilled with stock as described from time to time.

The speed of the forward movement of the mold is so regulated by adjustment of the throttle valve 107 as to afford sufficient time for the extruded stock to flow into and completely fill the mold cavities.

When it becomes necessary to clean the die-plates 32, 33, they are lifted from the die-box 28, the lever 44 or 45 (Fig. 3) being actuated to turn the rock shafts 42, 43 and thus disengage the lugs 40, 41 (Fig. 8) from the respective lugs 38, 39 which are formed on the die-plates. The lifting of the die-plates from the die-box is effected by lowering the cross-head 49, turning one or the other of the hand levers 57, 58 (Fig. 3) to engage the hooks 53, 54 with the flange 32ᵃ, 33ᵃ of the die-plates, and then raising the cross-head 49 by means of the cylinder 52 to pull the die-plates from the box, after which they may be readily separated and cleaned, as will be apparent upon reference to Fig. 11.

The machine as described is rapid and largely automatic in operation, permitting the filling of successive molds with accurate quantities of stock and delivering the successively filled molds in convenient position for removal and for transportation to the vulcanizer. Other, more detailed, advantages will be apparent to those skilled in the art.

Various modifications are possible within the scope of my invention and I do not wholly limit my claims to the specific procedure or construction described.

I claim:

1. Molding apparatus comprising a die assembly having a die aperture, reciprocating means for propelling successive molds past said die aperture, and means for automatically engaging the successive molds as they pass from the die aperture and retaining them against return movement with the said reciprocating means.

2. Molding apparatus comprising a die assembly having a die aperture, means for moving the mold past the die aperture to receive stock therefrom in its mold cavity, and a plunger for forcing stock through the die aperture into the mold cavity, the die assembly being so constructed that the force of the plunger causes the mouth of the die aperture to press upon the mouth of the mold.

3. Molding apparatus comprising mold propelling means and an extrusion device for progressively filling a mold as it is moved by the said propelling means, the extrusion device comprising a box structure, means for heating the same, and lining members removably mounted in the box structure and together with each other defining a die aperture.

4. Molding apparatus as defined in claim 3 including a reciprocable plunger for forcing plastic stock from within the lining members through the die aperture and means on the plunger engageable with the lining members for pulling them from the box structure.

In witness whereof I have hereunto set my hand this 15th day of March, 1926.

FRANK J. MacDONALD.